United States Patent
Ebi

(10) Patent No.: US 8,537,393 B2
(45) Date of Patent: Sep. 17, 2013

(54) IMAGE FORMING APPARATUS AND IMAGE FORMING SYSTEM

(75) Inventor: Yukari Ebi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 712 days.

(21) Appl. No.: 12/778,409

(22) Filed: May 12, 2010

(65) Prior Publication Data

US 2010/0309499 A1  Dec. 9, 2010

(30) Foreign Application Priority Data

Jun. 9, 2009  (JP) .................................. 2009-137991

(51) Int. Cl.
*G06F 3/12* (2006.01)
*G06K 15/00* (2006.01)

(52) U.S. Cl.
USPC .......... 358/1.15; 358/1.13; 358/1.18; 358/1.9

(58) Field of Classification Search
None
See application file for complete search history.

(56) References Cited

U.S. PATENT DOCUMENTS

2005/0030334 A1* 2/2005 Kai et al. ......................... 347/19
2006/0269342 A1* 11/2006 Yoshida et al. ................. 400/62

FOREIGN PATENT DOCUMENTS

| JP | 63-096673 | 4/1988 |
| JP | 01-188867 | 7/1989 |
| JP | 2004-213132 | 7/2004 |
| JP | 2005-332100 | 12/2005 |

* cited by examiner

*Primary Examiner* — Dov Popovici

(74) *Attorney, Agent, or Firm* — Edwards Wildman Palmer LLP; David G. Conlin; Steven M. Jensen

(57) ABSTRACT

An MFP is connected with an administrator PC having a printer driver installed thereon through a network to be controlled by the printer driver. The MFP is provided with an image reading portion for optically reading predetermined printed matter to input image data, a printing set value judging portion for judging printing set values when printed matter is printed from input image data, and an initial set value input portion for inputting the judged printing set values as initial set values of a printer driver. The initial set value input portion set printing set values obtained by reading printed matter on an initial set value input screen of a printer driver as the initial set values of the printer driver, and initial set values set to the initial set value input screen are changeable by a user.

6 Claims, 16 Drawing Sheets

| ADDRESS | UPPER-LEFT COORDINATE (Xs,Ys) | | LOWER-RIGHT COORDINATE (Xe,Ye) | | |
|---|---|---|---|---|---|
| 1 | 3 | 2 | 15 | 14 | 晴 |
| 2 | 20 | 2 | 33 | 14 | れ |

FIG. 11

|   | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|----|----|----|----|----|----|----|----|----|
| 1 | 0 | 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 1 | 0 | 0 | 0 | 0 | 0 | 0 |
| 3 | 0 | 0 | 0 | 0 | 0 | 0 | 0 | 0 | 0 | 1 | 1 | 1 | 1 | 1 | 0 | 0 | 0 | 0 |
| 4 | 0 | 0 | 0 | 0 | 0 | 0 | 0 | 0 | 0 | 0 | 0 | 1 | 0 | 0 | 0 | 0 | 0 | 0 |
| 5 | 0 | 0 | 1 | 1 | 1 | 1 | 0 | 0 | 0 | 1 | 1 | 1 | 1 | 1 | 0 | 0 | 0 | 0 |
| 6 | 0 | 0 | 1 | 0 | 0 | 1 | 0 | 0 | 0 | 0 | 0 | 1 | 0 | 0 | 0 | 0 | 0 | 0 |
| 7 | 0 | 0 | 1 | 0 | 0 | 1 | 0 | 0 | 1 | 1 | 1 | 1 | 1 | 1 | 0 | 0 | 0 | 0 |
| 8 | 0 | 0 | 1 | 1 | 1 | 1 | 0 | 0 | 0 | 0 | 0 | 0 | 0 | 0 | 0 | 0 | 0 | 0 |
| 9 | 0 | 0 | 1 | 0 | 0 | 1 | 0 | 0 | 0 | 1 | 1 | 1 | 1 | 1 | 0 | 0 | 0 | 0 |
| 10 | 0 | 0 | 1 | 0 | 0 | 1 | 0 | 0 | 0 | 1 | 0 | 0 | 0 | 1 | 0 | 0 | 0 | 0 |
| 11 | 0 | 0 | 1 | 1 | 1 | 1 | 0 | 0 | 0 | 1 | 1 | 1 | 1 | 1 | 0 | 0 | 0 | 0 |
| 12 | 0 | 0 | 0 | 0 | 0 | 0 | 0 | 0 | 0 | 1 | 0 | 0 | 0 | 1 | 0 | 0 | 0 | 0 |
| 13 | 0 | 0 | 0 | 0 | 0 | 0 | 0 | 0 | 0 | 1 | 1 | 1 | 1 | 1 | 0 | 0 | 0 | 0 |
| 14 | 0 | 0 | 0 | 0 | 0 | 0 | 0 | 0 | 0 | 1 | 0 | 0 | 0 | 1 | 0 | 0 | 0 | 0 |
| 15 | 0 | 0 | 0 | 0 | 0 | 0 | 0 | 0 | 0 | 0 | 0 | 0 | 0 | 0 | 0 | 0 | 0 | 0 | h

FIG. 12A

| | UPPER-LEFT PIXEL | | LOWER-RIGHT PIXEL | |
|---|---|---|---|---|
| | Xs | Ys | Xe | Ye |
| RECTANGLE 1 | 2 | 1 | 2 | 1 |
| RECTANGLE 2 | | | | |
| RECTANGLE 3 | | | | |
| RECTANGLE 4 | | | | |
| ---- | | | | |

FIG. 12B

| | UPPER-LEFT PIXEL | | LOWER-RIGHT PIXEL | |
|---|---|---|---|---|
| | Xs | Ys | Xe | Ye |
| RECTANGLE 1 | 2 | 1 | 2 | 1 |
| RECTANGLE 2 | 12 | 2 | 12 | 2 |
| RECTANGLE 3 | | | | |
| RECTANGLE 4 | | | | |
| ---- | | | | |

FIG. 12C

| | UPPER-LEFT PIXEL | | LOWER-RIGHT PIXEL | |
|---|---|---|---|---|
| | Xs | Ys | Xe | Ye |
| RECTANGLE 1 | 12 | 2 | 12 | 2 |
| RECTANGLE 2 | | | | |
| RECTANGLE 3 | | | | |
| RECTANGLE 4 | | | | |
| ---- | | | | |

FIG. 12D

| | UPPER-LEFT PIXEL | | LOWER-RIGHT PIXEL | | x-SIDE LENGTH | y-SIDE LENGTH |
|---|---|---|---|---|---|---|
| | Xs | Ys | Xe | Ye | | |
| DETERMINED RECTANGLE 1 | 2 | 1 | 2 | 1 | 1 | 1 |
| DETERMINED RECTANGLE 2 | | | | | | |
| DETERMINED RECTANGLE 3 | | | | | | |
| DETERMINED RECTANGLE 4 | | | | | | |
| ---- | | | | | | |

FIG. 13A

| | UPPER-LEFT PIXEL | | LOWER-RIGHT PIXEL | |
|---|---|---|---|---|
| | Xs | Ys | Xe | Ye |
| RECTANGLE 1 | 12 | 2 | 12 | 2 |
| RECTANGLE 2 | 10 | 3 | 10 | 3 |
| RECTANGLE 3 | | | | |
| RECTANGLE 4 | | | | |
| ---- | | | | |

FIG. 13B

| | UPPER-LEFT PIXEL | | LOWER-RIGHT PIXEL | |
|---|---|---|---|---|
| | Xs | Ys | Xe | Ye |
| RECTANGLE 1 | 12 | 2 | 12 | 2 |
| RECTANGLE 2 | 10 | 3 | 10 | 3 |
| RECTANGLE 3 | 11 | 3 | 11 | 3 |
| RECTANGLE 4 | | | | |
| ---- | | | | |

FIG. 13C

| | UPPER-LEFT PIXEL | | LOWER-RIGHT PIXEL | |
|---|---|---|---|---|
| | Xs | Ys | Xe | Ye |
| RECTANGLE 1 | 10 | 2 | 12 | 3 |
| RECTANGLE 2 | | | | |
| RECTANGLE 3 | | | | |
| RECTANGLE 4 | | | | |
| ---- | | | | |

FIG. 13D

| | UPPER-LEFT PIXEL | | LOWER-RIGHT PIXEL | | x-SIDE LENGTH | y-SIDE LENGTH |
|---|---|---|---|---|---|---|
| | Xs | Ys | Xe | Ye | | |
| DETERMINED RECTANGLE 1 | 2 | 1 | 2 | 1 | 1 | 1 |
| DETERMINED RECTANGLE 2 | 9 | 2 | 15 | 7 | 7 | 6 |
| DETERMINED RECTANGLE 3 | 3 | 5 | 6 | 11 | 4 | 7 |
| DETERMINED RECTANGLE 4 | 10 | 9 | 14 | 14 | 5 | 6 |
| ---- | | | | | | |

PRINTER DRIVER INITIAL SETTING — 40

NUMBER OF COPIES(I): 1
☑ PRINT IN COPY UNIT(L)

DOUBLE-SIDED PRINTING(Y)
○ SINGLE-SIDED PRINTING
◉ DOUBLE-SIDED PRINTING
○ MIDDLE-BINDING PRINTING (SAME MAGNIFICATION)

OUTPUT
BINDING EDGE(G): LEFT
STAPLE(S): NO
☐ PUNCH(C)
☐ RELEASE OFFSET(E)
BINDING MARGIN(M): NO
SETTING(T)...

N-UP PRINTING(N): 2-Up
☐ BORDER(B)
ORDER(O): FROM LEFT TO RIGHT

PRINTING ORIENTATION(R):
◉ PORTRAIT
○ LANDSCAPE
☐ 180° ROTATED PRINT(T)

COLOR MODE(M):
○ AUTOMATIC
◉ COLOR
○ GRAY SCALE(MONOCROME)

DENSITY: 1...3...5

SHEET SIZE(I): 210 × 297 MM A4
CUSTOM(M)...

SHEET FEED
SHEET TRAY(E): AUTOMATIC SHEET FEED
SHEET TYPE(Y): AUTOMATIC SHEET FEED
DETAIL(T)...

DISCHARGE TRAY(O): OFFSET TRAY

PREVIEW — 41
TEST PRINTING — 42

PREVIEW DISPLAY — 43

OK — 44
CANCEL — 45

IMAGE FORMING APPARATUS AND IMAGE FORMING SYSTEM

CROSS-NOTING PARAGRAPH

This non-provisional application claims priority under 35 U.S.C. §119(a) on Patent Application No. 2009-137991 filed in JAPAN on Jun. 9, 2009, the entire contents of which are hereby incorporated herein by reference.

FIELD OF THE INVENTION

The present invention relates to an image forming apparatus and an image forming system, and more particularly, to an image forming apparatus and an image forming system capable of input setting of initial values of a printer driver.

BACKGROUND OF THE INVENTION

In recent years, in order to address environmental problems, activity for reducing the amount of $CO_2$ emission is spread, and a distribution by an electronic file using an electronic mail and an electronic filing are increased to reduce a quantity of printed copies, however, it is realistically difficult to eliminate printing on a recording sheet in offices etc. Thus, in offices etc., by performing so-called ecology-printing to reduce the number of recording sheets to be printed, efforts to reduce recording sheets, toner, power consumption at the time of printing etc., are being made. Specifically, the ecology-printing as described above can be performed, for example, by switching color printing, single-sided printing, and one in one (one-up) for printing one page on a recording sheet to monochrome printing, double-sided printing, and N in one (N-up: N is two or more) for performing N-up printing of a plurality of pages on a recording sheet, respectively.

For example, in the case of performing copying with an MFP (digital multi-functional peripheral) etc., provided with a printer function and a copy function, when a system administrator etc., previously sets environmentally-friendly copying conditions such as N in one copying and double-sided copying as initial set values, it is possible to execute copying under the copying conditions of the initial set values unless a user intentionally changes the copying conditions in each copying. This makes it possible to perform ecology-printing relatively easily.

However, in the case where printing data is transmitted from a PC (personal computer) etc., used by a user to the MFP to perform printing with the MFP, a setting of printing conditions of a printer driver installed in the PC needs to be changed to conditions of ecology-printing, while in the case where a plurality of PCs are connected to the MFP through a network, printing conditions of a printer driver in each of the plurality of PCs need to be changed, thus posing a problem of taking a lot of time to change processing.

Moreover, since installation of a printer driver in a PC is performed by a user as the occasion demands, it is hard even for an administrator of the MFP to recognize all PCs in which the printer driver is installed, and difficult to change printing conditions of the printer driver of all PCs.

With regard to this, for example, Japanese Laid-Open Patent Publication No. 2005-332100 describes a print setting sharing support apparatus in which initial set values of a printer driver whose printing conditions have been previously set by an administrator etc., can be downloaded by means of a Web function to incorporate in the printer driver, and the printing conditions of the printer driver can be shared among a plurality of PCs.

In addition, Japanese Laid-Open Patent Publication No. 63-96673 and Japanese Laid-Open Patent Publication No. 1-188867 describe a copier which reads a job sheet on which a mark etc., for instructing copying conditions in copying is described to facilitate input work of the copying conditions, and thereby enables inputting the copying conditions in accordance with the mark etc.

In the case of a technology described in Japanese Laid-Open Patent Publication No. 2005-332100 above, input of initial set values of a printer driver is performed by a user such as a system administrator from his/her own PC to a print setting sharing support device, however, since an inexperienced user etc., does not know printing conditions to be input as initial set values, there has been a problem of taking a lot of time to input setting of initial set values or inputting inappropriate initial set values erroneously.

Moreover, in the case where initial set values of a printer driver are input by using a job sheet described in Japanese Laid-Open Patent Publication No. 63-96673 and Japanese Laid-Open Patent Publication No. 1-188867, since a mark, a code, or a pattern corresponding to printing conditions such as the number of sheets to be printed are only added on the job sheet, it is a problem for a user not to recognize, at a glance, what printing conditions are to be set by the job sheet. Therefore, there has been a possibility that the user performs input setting of unintended printing conditions as initial set values of a printer driver.

SUMMARY OF THE INVENTION

An object of the present invention is to provide an image forming apparatus and an image forming system enabling input setting of initial set values (printing conditions) of a printer driver as intended by a user by reading predetermined printed matter as well as capable of suppressing erroneous input.

The object of the present invention is an image forming apparatus which is connectable with an information processing apparatus having a printer driver installed therein and controlled by the printer driver, comprising: an image reading portion which optically reads predetermined printed matter to input image data; a printing set value judging portion which judges printing set values when the printed matter is printed from the input image data; and an initial set value input portion which inputs the judged printing set values as initial set values of the printer driver.

The object of the present invention is the image forming apparatus, wherein printing set values judged by the printing set value judging portion are set as set values of the image forming apparatus.

The object of the present invention is the image forming apparatus, wherein the initial set value input portion sets printing set values judged by the printing set value judging portion to an initial set value input screen of the printer driver, and initial set values set to the initial set value input screen are changeable by a user.

The object of the present invention is the image forming apparatus, wherein the printing set value judging portion judges at least one of set values of a sheet size, monochrome or color, N-up printing, single-sided or double-sided, as printing set values when the printed matter is printed.

The object of the present invention is the image forming apparatus, wherein a preview image based on initial set values before being changed or after being changed by the user can be displayed on an initial set value input screen of the printer driver.

The object of the present invention is the image forming apparatus, wherein test printing based on initial set values before being changed or after being changed by the user can be executed on an initial set value input screen of the printer driver.

The object of the present invention is the image forming apparatus, wherein a storing portion is provided for storing initial set values of the printer driver input from the initial set value input portion.

The object of the present invention is the image forming system in which an information processing apparatus having a printer driver installed therein and an image forming apparatus controlled by the printer driver are connected through a network, wherein the image forming apparatus is provided with an image reading portion which optically reads predetermined printed matter to input image data; a printing set value judging portion which judges printing set values when the printed matter is printed from the input image data; and an initial set value input portion which inputs the judged printing set values as initial set values of the printer driver.

BRIEF DESCRIPTION OF THE DRAWINGS

FIG. 11 is a view for explaining an example of processing for fixing a rectangle;

FIG. 12A to FIG. 12D are views for explaining an example of processing for fixing the rectangle in FIG. 11;

FIG. 13A to FIG. 13D are views for explaining an example of processing for fixing the rectangle in FIG. 11;

FIG. 14 is a view showing an example of the state of a fixed rectangle;

FIG. 16 is a view showing an example of an initial set value input screen which is displayed on a display portion of an MFP;

PREFERRED EMBODIMENTS OF THE INVENTION

Description will hereinafter be given for preferred embodiments according to an image forming apparatus and an image forming system of the present invention with reference to the attached drawings.

Figure 1:
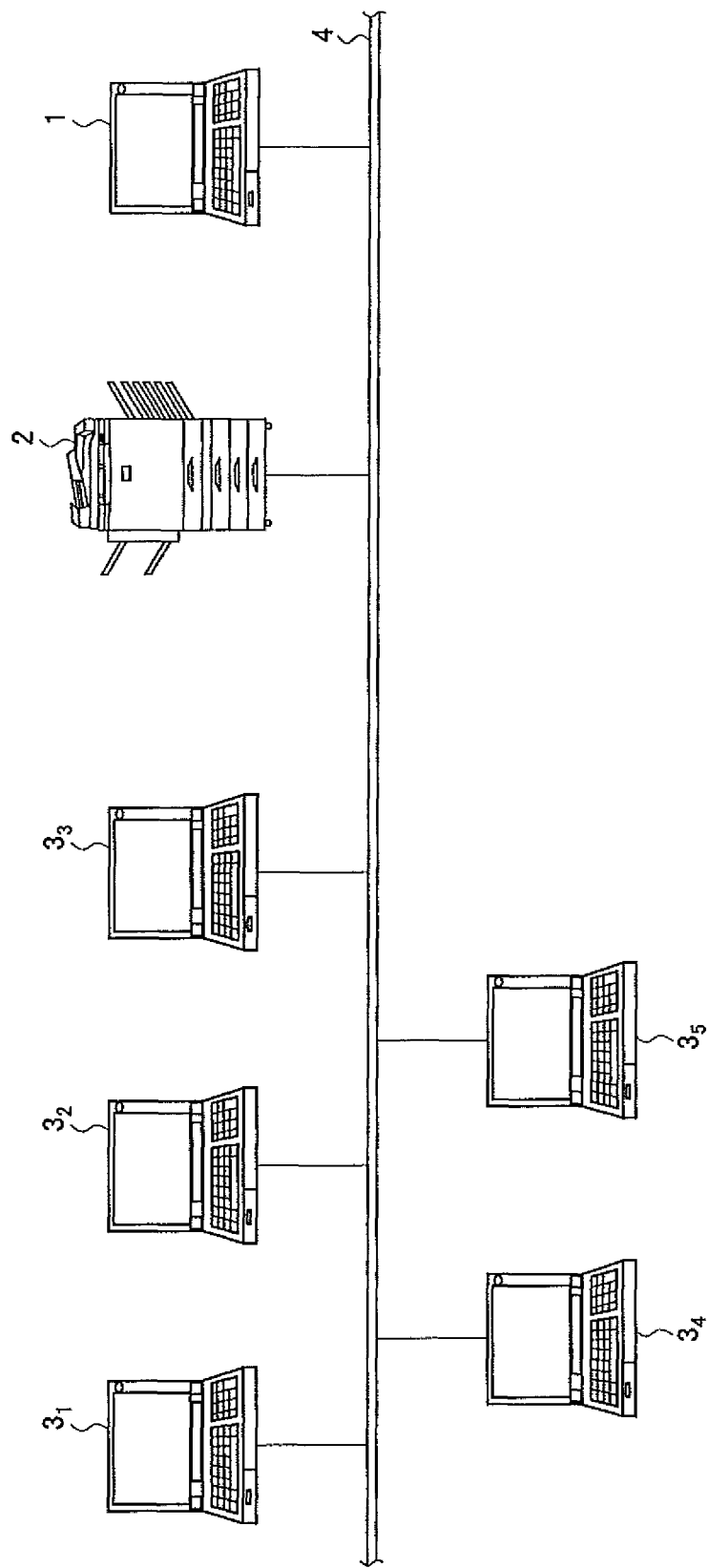
FIG. 1 is a view showing a configuration example of an image forming system according to an embodiment of the present invention.

FIG. 1 is a view showing a configuration example of an image forming system according to an embodiment of the present invention, where 1 denotes an administrator PC (personal computer) as an example of an information processing apparatus, 2 denotes a digital multi-functional peripheral (hereinafter referred to as an MFP) which is an example of an image forming apparatus, $3_1$ to $3_5$ denote client PCs, and 4 denotes a network such as a LAN (Local Area Network). The administrator PC 1, the MFP 2, and the client PCs $3_1$ to $3_5$ (hereinafter referred to as client PC 3) are connected to each other through the network 4, and the MFP 2 executes image forming processing such as printing based on an instruction from the client PC 3.

The administrator PC 1 and the client PC 3 are comprised of general purpose computers, and printer drivers which are necessary to perform printing processing in the MFP 2 are previously installed therein. Initial set values serving as default are set to these printer drivers, and a user is able to perform printing processing by using the initial set values of the printer driver as they are or changing the initial set values in accordance with printing conditions when performing image formation from the administrator PC 1 or the client PC 3.

Figure 2:
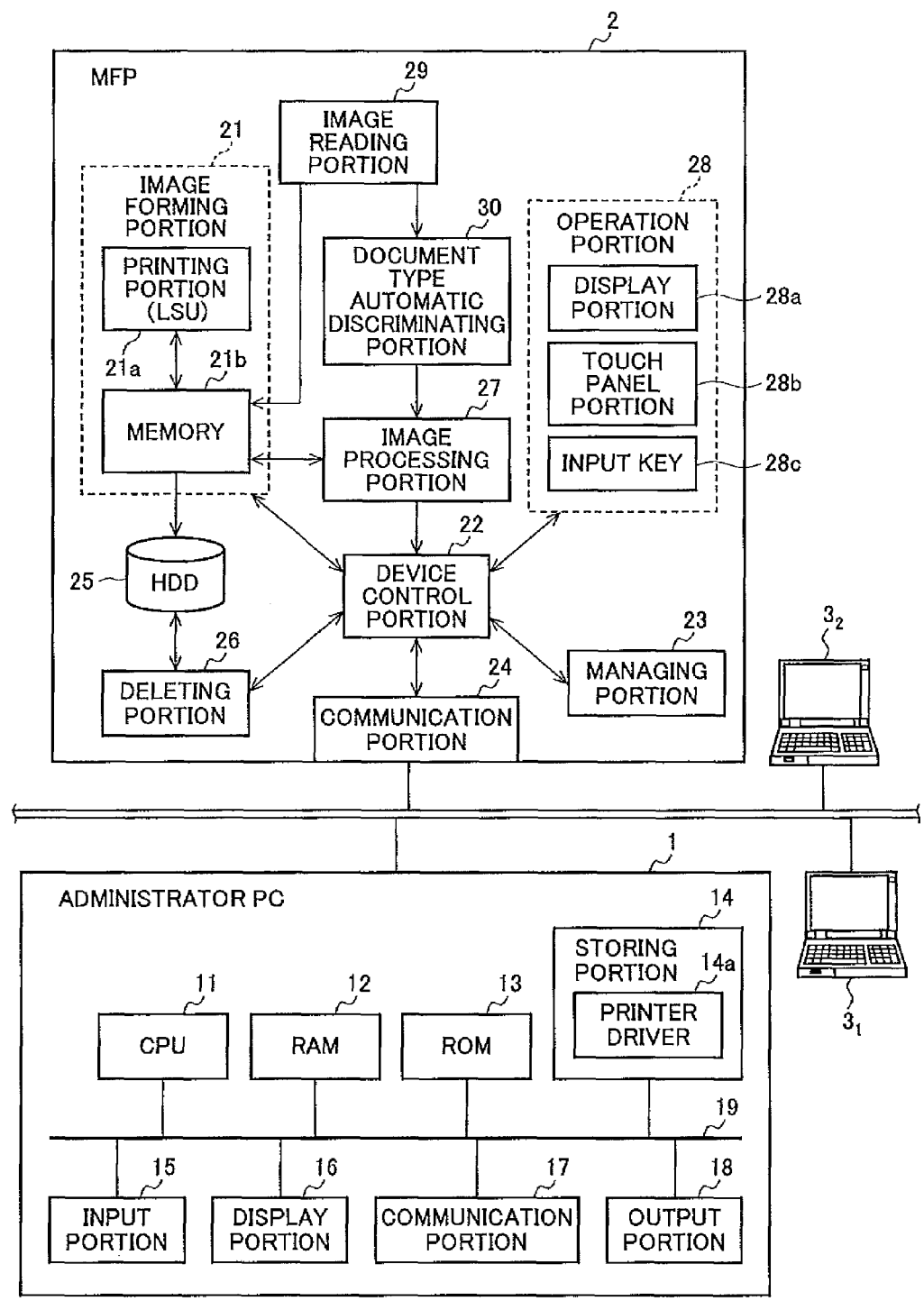
FIG. 2 is a block diagram showing a configuration example of an administrator PC and an MFP shown in FIG. 1.

FIG. 2 is a block diagram showing a configuration example of the administrator PC and the MFP shown in FIG. 1. Here, although description will be given for the configuration of the administrator PC 1 as a typical example, another client PC 3 also has the same configuration basically. Moreover, although an image forming apparatus is explained using the MFP 2 as an example, but not limited to this example, it may be a single-function printer apparatus which is controllable by a printer driver installed on a PC.

The MFP 2 of the example is configured as a multi-functional peripheral provided with a plurality of functions such as a printer function, a copy function, a facsimile function, and a scanner function. The MFP 2 is provided with an image forming portion 21 which performs printing processing of data, a device control portion 22 which controls each of the functions provided in the MFP 2, a managing portion 23 which is a memory storing control information and setting information etc., of the MFP 2, a communication portion 24 which communicates with the administrator PC 1 and the client PC 3 through the network 4, an HDD (hard disc drive) 25 which is an example of a storing portion for storing various kinds of data, an erasing portion 26 which erases data stored in the HDD 25, an image processing portion 27 which applies various kinds of image processing to data, an operation portion 28 which receives operation input by a user, an image reading portion 29 which electronically reads a document image, and a document type automatic discriminating portion 30 which automatically discriminates the type of a document.

Moreover, the image forming portion 21 is provided with a printing portion 21a such as an LSU (Laser Scanning Unit) and a volatile memory 21b which temporarily holds data subjected to image processing by the image processing portion 27.

Moreover, the operation portion 28 is provided with a display portion 28a such as an LCD (Liquid Crystal Display), a touch panel portion 28b which receives operation input by the user through a touch panel, and an input key 28c which is comprised of an input key group such as various kinds of operating keys and a numerical keypad, and the user is able to perform inputting of an operation or inputting of various kinds of settings to the MFP 2 by operating the operation portion 28.

Brief description will hereinafter be given for an operation example related to an image processing mode equipped in the MFP 2.

(Copy Mode)

When the MFP 2 is used as a copier, data of a document read by the image reading portion 29 is output by the image forming portion 21 as a copy.

The image reading portion 29 is provided with a CCD (Charge Coupled Device) (not-shown), and is able to electronically read an image of the document set to a reading position. The data of the read document is then completed as output data on the volatile memory 21b and is temporarily stored in the HDD 25. In the case where there are a plurality of documents, the operation of reading and storing is repeated in this manner. Thereafter, based on a processing mode instructed from the operation portion 28, the data stored in the HDD 25 is read out sequentially at an appropriate timing and transmitted to the volatile memory 21b. The data is then transferred to the printing portion 21a from the volatile memory 21b so as to be written into the printing portion 21a.

(Printer Mode)

Next, when the MFP is used as a printer, data received from the communication portion 24 is output from the image forming portion 21 through the volatile memory 21b etc. Note that, the printer driver is installed in the administrator PC 1 or the client PC 3, and the printer function of the MFP 2 can be controlled by each of the PCs.

The communication portion 24 is connected to the network 4 by wire or radio and receives data from the administrator PC 1 or the client PC 3 which connected to the network 4. The data received in this way is transmitted to the volatile memory 21b page by page as data to be output and temporarily stored in the HDD 25 as the occasion demands. Then, the data is transmitted again from the HDD 25 to the volatile memory 21b and transferred to the printing portion 21a similarly to the above-described case where the MFP 2 is used as a copier.

(Scanner Mode)

Additionally, when the MFP 2 is used as a network scanner, the data of the document read by the image reading portion 29 can be transmitted to the administrator PC 1 or the client PC 3 from the communication portion 24 through the network 4. Here, the document is also electronically read by the CCD provided in the image reading portion 29. The data of the read document is then completed as output data on the volatile memory 21b and is temporarily stored in the HDD 25. Then, the data is transmitted again from the HDD 25 to the volatile memory 21b, and after establishing communication with a transmitting destination instructed through the operation portion 28, is transmitted to the intended transmitting destination from the communication portion 24 using an electronic mail etc. Note that, a scanner driver is installed on the administrator PC 1 or the client PC 3, a scanner function of the MFP 2 can thereby be controlled from each of the PCs.

(Facsimile Mode)

When the MFP 2 is used as a facsimile apparatus, the communication portion 24 can be connected with the facsimile apparatus through the network 4. In addition, when the communication portion 24 is provided with a modem function, it becomes possible to connect with the facsimile apparatus through a telephone line. Note that, a facsimile function of the MFP 2 can be controlled from each of the PCs by installing a FAX driver in the administrator PC 1 or the client PC 3.

Each portion composing the MFP 2 according to the present embodiment is controlled by the device control portion 22, and monitors an operation instruction from the input key 28c such as the input key group provided in the operation portion 28 as well as guides and displays information to be notified to the user, such as information of the state of the MFP 2, through the display portion 28a accurately. Moreover, information of each portion composing the MFP 2 controlled by the device control portion 22 is managed in the managing portion 23, and based on the information, the device control portion 22 controls the operation of the entire MFP 2.

In FIG. 2, the administrator PC 1 is comprised of, for example, a general purpose computer and is comprised of a CPU 11 which controls an operation of the client PC 1, a RAM 12 which serves as an execution area of a control program etc., a ROM 13 which stores a control program and data etc., a storage portion 14 which is comprised of an HDD etc., an input portion 15 which is comprised of pointing devices such as a mouse and a keyboard, a display portion 16 such as an LCD, a communication portion 17 which is a communication interface connecting to the network 4, an output portion 18 which outputs data to an external device such as a printer, and a system bus 19 which connects these portions to each other. A printer driver 14a which is necessary to execute printing in the MFP 2 is stored, for example, in the storage portion 14 and the CPU 11 reads it out into the RAM 12 when executing printing.

The main characteristic portion of the present invention is to enable input setting of initial set values (printing conditions) of a printer driver 14a as intended by a user as well as to suppress erroneous input by causing the MFP 2 to read predetermined printed matter. As a configuration therefore, the MFP 2 is provided with an image reading portion 29 corresponding to an image reading portion which optically reads printed matter (document) to input image data, a printing set value judging portion which judges printing set value when printed matter is printed from the input image data, and an initial set value input portion which inputs the judged printing set values as initial set values of the printer driver 14A. The printing set value portion is realized by the image reading portion 29, the document type automatic discriminating portion 30, the image processing portion 27, and the device control portion 22. In addition, the initial set value input portion is realized by the device control portion 22 and the operation portion 28.

Figure 3:
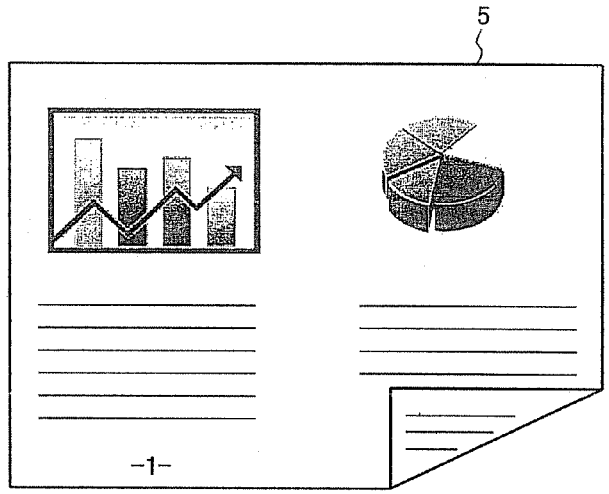
FIG. 3 is a view showing an example of printed matter printed with printing set values of double-sided, two-up, color, and A4.

For example, the MFP 2 may read the printed matter as shown in FIG. 3 by the image reading portion 29 to input image data, and judge printing set values when the printed matter is printed from the image data. The printing set value judging portion is able to judge at least one of setting values of a sheet size, monochrome or color, N-up printing, single-sided or double-sided. Description will be given for a specific judging method by the printing set value judging portion with reference to FIG. 4 to FIG. 15B described below.

FIG. 3 is a view showing an example of printed matter printed with printing set values of double-sided, two-up, color, and A4, where 5 denotes printed matter. A system administrator etc., only by preparing a plurality of types of such printed matter in advance and causing the MFP 2 to read desired printed matter, is capable of input setting of the printing set values when the printed matter is printed as the initial set values of the printer driver 14a.

Specifically, when the user gives a display instruction of an initial set value input screen (FIG. 16 described below) from the operation portion 28, a message for urging the display portion 28a to set the printed matter is displayed. When the user, for example, sets the printed matter 5 as shown in FIG. 3 to the MFP 2 and instructs to start reading, the image reading portion 29 reads the printed matter 5 to input image data. Then the printing set value judging portion judges printing set values when the printed matter 5 is printed from the image data input by the image reading portion 29. In the case of the printed matter 5, it is judged as double-sided, two-up, color, and A4.

The initial set value input portion sets the printing set values judged by the printing set value judging portion to the initial set value input screen of the printer driver 14a. In the case of the printed matter 5, for each of items of "single-sided/double-sided", "N-up printing", "monochrome/color", and "sheet size", double-sided, two-up, color, and A4 are set, respectively. Then, it is possible for a user to change the initial set values set to the initial set value input screen at any time. The user is able to change initial set values from the touch panel portion 28b, the input key 28c etc., of the operation portion 28.

In the above, each of printing set values (double-sided, two-up, color, and A4) obtained from the printed matter 5 is used as initial set values of the printer driver 14a. A user such as a system administrator may input printing set values other than single-sided/double-sided, N-up printing, monochrome/color, and a sheet size as the occasion demands. In this way, it is possible to facilitate input of the initial set values of the printer driver 14a and to suppress erroneous input. For example, when printing set values for the above-described ecology-printing are obtained from the printed matter 5, it is also possible to use the printing set values as the initial set values of the printer driver 14a.

In addition, although setting values for each function (in the case of the printer function, the number of sheets to be printed, single-sided/double-sided, N-up printing, a sheet size, monochrome/color, a sheet discharging tray, a sheet feeding cassette, density, output etc.) are stored in the MFP 2, each of the printing set values obtained from the printed matter 5 can be set as a set value of the MFP 2. For example, in the case of a printer function or a copy function, since each function has each of the set values of the above-described single-sided/double-sided, N-up printing, monochrome/color, a sheet size, each of the printing set values obtained from the printed matter 5 can be set as each set value of these items.

Here, the printing set value judging portion is able to judge at least one of setting values of a sheet size, monochrome/color, N-up printing, single-sided or double-sided. Description will hereinafter be given to a specific example of a judging method of a sheet size by the printing set value judging portion based on FIG. 4.

Figure 4:
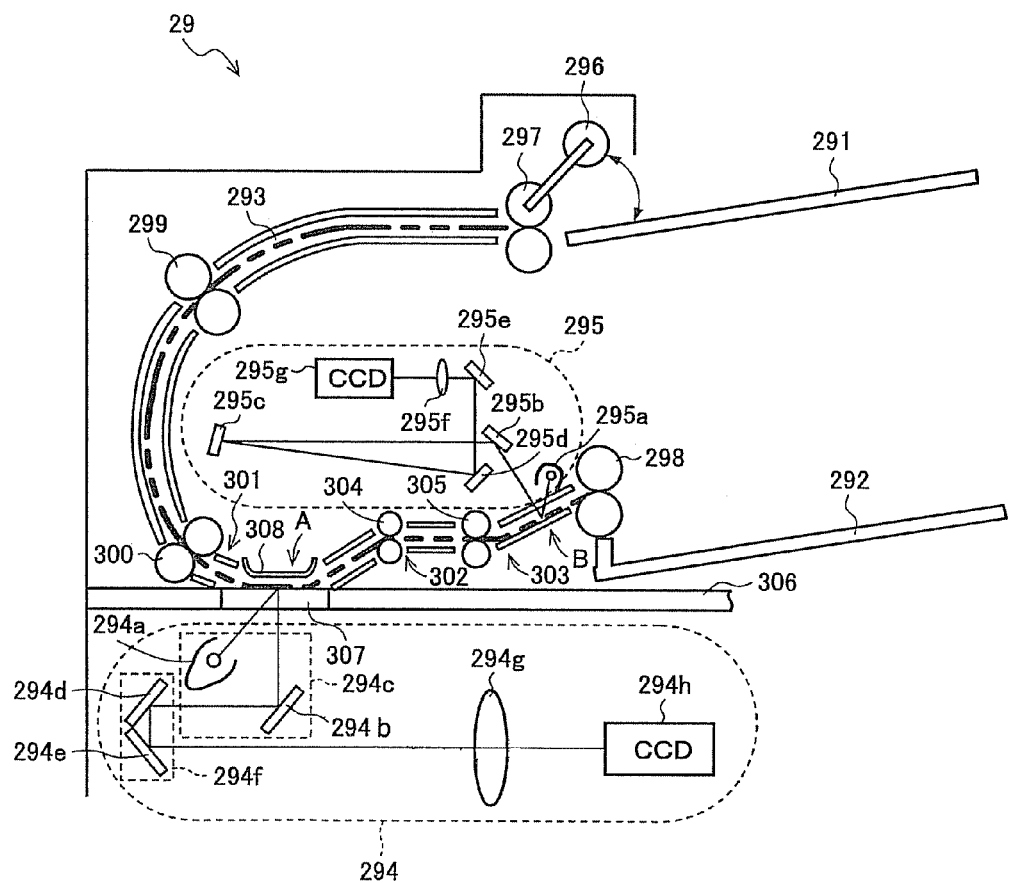
FIG. 4 is a cross-sectional view showing a configuration example of a chief part of an image reading portion shown in FIG. 2.

FIG. 4 is a cross-sectional view showing an example of main portions of the image reading portion 29 shown in FIG. 2. The image reading portion 29 is provided with such main portions as a document transport path 293 from a document placement tray 291 to a document discharging tray 292, a first image reading portion 294 which reads an image of a first surface (front side) of the document, and a second image reading portion 295 which reads an image of a second surface (back side) of the document. The document is transported through the document transport path 293 from the document placement tray 291 to the document discharging tray 292. A pick-up roller 296 and a separation roller 297 are arranged on an upstream side end of the document transport path 293 in the direction of transporting the document, and the document placed on the document placement tray 291 is supplied to the document transport path 293 sheet by sheet, by the pick-up roller 296 and the separation roller 297. In addition, a discharging roller 298 is arranged on a downstream side end of the document transport path 293 in the direction of transporting the document, and the document having been transported through the document transport path 293 is discharged to the document discharging tray 292 by the discharging roller 298.

In the middle of the document transport path 293, an image reading position A for the first image reading portion 294 and an image reading position B for the second image reading portion 295 are provided. In an upstream side of the image reading position A in the direction of transporting the document, transport rollers 299, 300, and a curving portion 301 of the document transport path 293 are arranged in this order in the direction of transporting the document. The transport rollers 299 and 300, respectively, are driven by a document transporting motor (not-shown), and transport the document toward the image reading position A. The curving portion 301 is curved convexly in the direction of lower-left in FIG. 4.

In the document transport path 293 between the image reading position A and the image reading position B, a bend portion 302 convex upward and a bend portion 303 convex downward are provided. A driven roller 304 is arranged on the bend portion 302, and a transport roller 305 is arranged in the vicinity of an upstream side of the bend portion 303. The transport roller 305 is driven by a document transporting motor to transport the document toward the document reading position B.

The first image reading portion 294 is provided with a first scanning unit 294c having an exposure lamp 294a and a first reflection mirror 294b, a second scanning unit 294f having a second reflection mirror 294d and a third reflection mirror 294e, an imaging lens 294g, and a CCD sensor 294h. Light irradiated from the exposure lamp 294a and reflected on the first surface of the document, is sequentially reflected by the first reflection mirror 294b, a second reflection mirror 294d, and a third reflection mirror 294e to be incident on the imaging lens 294g. The imaging lens 294g forms an image of incident light on the CCD sensor 294h. The CCD sensor 294h photoelectrically converts the light of the image formed by the imaging lens 294g and reads as image data.

The first scanning unit 294c and the second scanning unit 294f, respectively, are configured so as to be displaceable to the vertical scanning direction along with platen glass 306 on which a document is placed when an image of the document is read by a document fixing system. The first image reading portion 294 displaces the first scanning unit 294c and the second scanning unit 294f in the vertical scanning direction, thereby making it possible to read the image of the document placed and fixed on the platen glass 306 and obtain the image data of the image of the document.

Here, positions of the first scanning unit 294c and the second scanning unit 294f when reading an image in a so-called document moving system which reads the image of the document being transported through the document transport path 293, are set to a home position of the first scanning unit 294c and the second scanning unit 294f when reading an image in the so-called document fixing method which reads the image of the document placed on the platen glass 306.

In addition, platen glass 307 is arranged on the image reading position A, and the light emitted from the exposure lamp 294a irradiates the document through the platen glass 307. On a wall surface facing the platen glass 307 of the document transport path 293 in the image reading position A, a standard white board 308 which is used for shading compensation is arranged The second image reading portion 295 is provided with an exposure lamp 295a, a plurality of reflection mirrors 295b, 295c, 295d, and 295e, an imaging lens 295f, and a CCD sensor 295g. Light irradiated from the exposure lamp 295a and reflected on the second surface of the document, is sequentially reflected by reflection mirrors 295b to 295e to be incident on the imaging lens 295f. The imaging lens 295f forms an image of incident light on the CCD sensor 295g. The CCD sensor 295g photoelectrically converts the light of the image formed by the imaging lens 295f and reads as image data.

As shown in FIG. 4, the image reading portion 29 is provide with the first image reading portion 294 and the second image reading portion 295 which are independent for reading the front side or the back side of the document, and therefore, able to read the both sides of the document while transporting the document. When the document is transported to the image reading position A, it is possible to calculate the width of the read document by counting the number of pixels in a main scanning direction of the document read by the CCD sensor 294h in the first image reading portion 294. In addition, it is possible to calculate the length of the read document by counting the pulse number of document transporting from the time point when the front end part of the document is detected at the image reading position A to when the rear end part of the document passes through the image reading position A.

According to the above, it is possible to judge the sheet size of the document. In this way, judging processing of the sheet size is executed by the image reading portion 29 and the device control portion 22.

Next, description will be given for a specific example of a judging method of monochrome/color and single-sided/double-sided by a printing set value judging portion based on FIG. 5.

Figure 5:
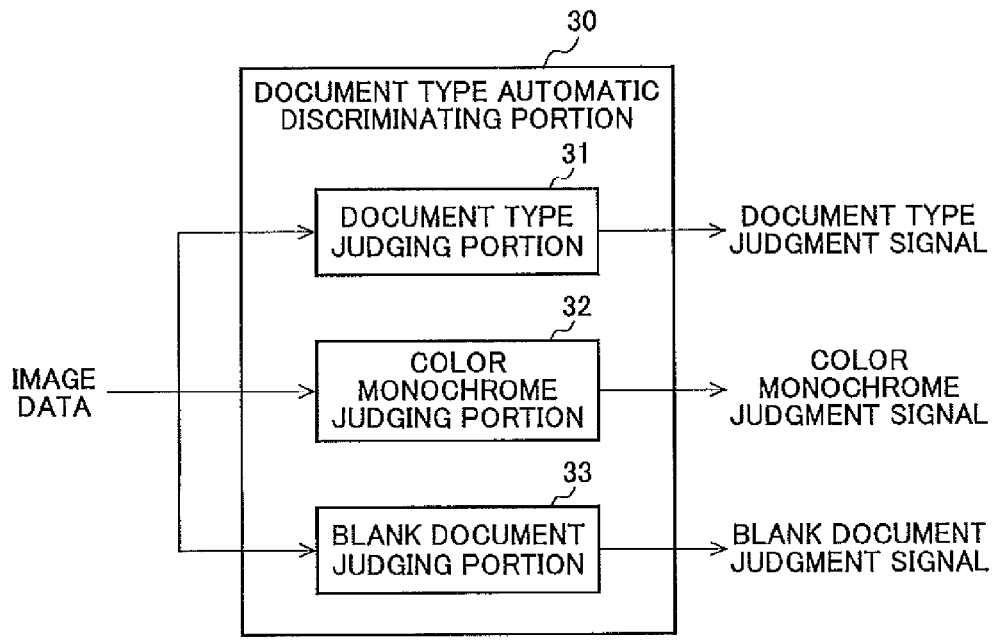
FIG. 5 is a block diagram showing a detailed configuration example of a document type automatic judging portion shown in FIG. 2.

FIG. 5 is a block diagram showing a detailed configuration example of a document type automatic discriminating portion 30 shown in FIG. 2. In the figure, the document type automatic discriminating portion 30 is comprised of a document type judging portion 31, a color monochrome judging portion 32 and a blank document judging portion 33. The document type judging portion 31 judges a type of document read in the image reading portion 29. Here, types of documents to be judged include a character document, a printing photograph document, and a character printing photograph document in which characters and printed photographs are mixed.

Moreover, the document type automatic discriminating portion 30 is provided with the color monochrome judging portion 32 for performing automatic color discrimination processing (ACS: Auto Color Selection) which is processing for discriminating whether the read document is a color document or a monochrome document based on the above image data, and the blank document judging portion 33 for performing judgment processing for judging whether or not it is a blank document (plain document or not), in addition to the above-described document type judging portion 31. Further, image data of RGB output from the document type automatic discriminating portion 30, a color monochrome judgment signal indicating a judgment result by the color monochrome judging portion 32, a document type judgment signal indicating a judgment result by the document type judging portion 31 and a blank document judgment signal indicating a judgment result by the blank document judging portion 33 are input into the image processing portion 27 at a post-stage.

In the above description, it is possible to judge whether a document is monochrome or color by the color monochrome judging portion 32 provided in the document type automatic discriminating portion 30. Additionally, it is possible to judge whether or not respective of the front side and the back side of a document is blank by the blank document judging portion 33. This makes it possible to judge whether a document is single-sided or double-sided. In this way, judgment processing for judging monochrome/color and single-sided/double-sided is executed by the document type automatic discriminating portion 30 and the device control portion 22.

Next, description will be given for a specific example of a judging method of N-up printing by the printing set value judging portion based on FIG. 6 to FIG. 15B. The example explains about the case of using a method of detecting a blank between, printing areas, but not limited thereto, and for example, it may be allowed to use a method of detecting a page number added to each page, a method of detecting a partition line added between N-up areas, and the like.

Figure 6:
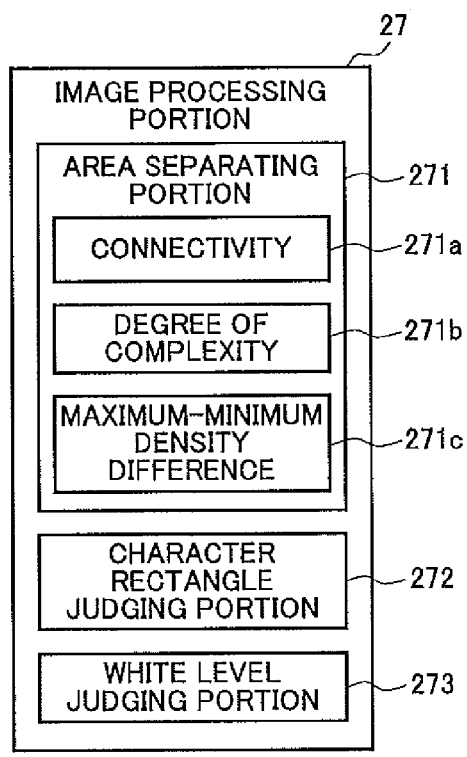
FIG. 6 is a block diagram showing a detailed configuration example of an image processing portion shown in FIG. 2.

FIG. 6 is a block diagram showing a detailed configuration example of the image processing portion 27 shown in FIG. 2. In the figure, the image processing portion 27 is comprised of an area separating portion 271, a character rectangle judging portion 272, and a white level judging portion 273. The area separating portion 271 is a processing portion for separating image data that is input by reading a document in the image reading portion 29 into a predetermined area (character area). The area separating portion 271 has connectivity 271a, degree of complexity 271b and a maximum-minimum density difference 271c as a parameter, to separate an area of image data.

Here, to obtain the connectivity 271a, first, the density is digitalized using any threshold value in the judging area in the case of separating an area. Then, a maximum length of the value with high density (large value) continuously connecting in every direction serves as the connectivity 271a. Here, it is judged as characters, in a case where the connectivity 271a is large.

Further, the degree of complexity 271b refers to what a density difference from a next pixel is added in a judging area in the case of separating an area.

The degree of complexity 271b can be specifically obtained as follows. That is, degree of complexity indicates a density difference of a next pixel, when a pixel density for each of coordinates shown in FIG. 9 described below is D(x, y).

Main scanning direction degree of $$\text{complexity} = \left[ \sum_{j=1}^{5} \left\{ \sum_{i=1}^{4} \{|D_{(i,j)} - D_{(i+1,j)}|\}/4 \right\} \right] / 5$$

Vertical scanning direction degree of $$\text{complexity} = \left[ \sum_{i=1}^{5} \left\{ \sum_{j=1}^{4} \{|D_{(i,j)} - D_{(i,j+1)}|\}/4 \right\} \right] / 5$$

Degree of complexity 271b=(main scanning direction degree of complexity+vertical scanning direction degree of complexity)/2

The degree of complexity 271b can be calculated using the above formula. Here, it is judged as a dot image, when the degree of complexity 271b is large.

Additionally, the maximum-minimum density difference 271c refers to a density difference between maximum density and minimum density in the judging area in the case of separating an area. It is judged as characters when the maximum-minimum density difference 271c is large, and is judged as a photograph when small.

The character rectangle judging portion 272 is a processing portion for making a character-judged space rectangular and managing upper-left coordinates and upper-right coordinates of the rectangle.

The white level judging portion 273 is a processing portion for judging a white part (white area, blank) of image data. Specifically, each of main scanning and vertical scanning has white judgment as an initial value. When images other than white come in, operation (processing) for judging the initial value of the white judgment as an effective image is performed.

First, description will be given for area separation processing by the area separating portion 271. The area separation processing is processing for cutting image data into areas based on the connectivity 271a, the degree of complexity 271b and the maximum-minimum density difference 271c, and a judging area of area separation is judged by using an extent of 7×7 pixels of processing pixels as a center.

Figure 7:
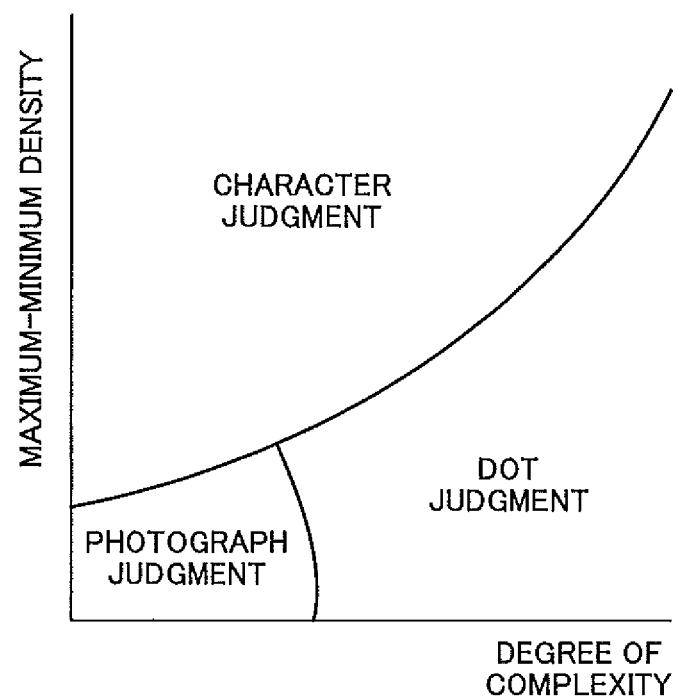
FIG. 7 is a graph showing an example of a relation between maximum-minimum density difference and degree of complexity.

Here, FIG. 7 is a graph showing an example of a relation between the maximum-minimum density difference 271c and the degree of complexity 271b. Since there is a tendency that the greater the maximum-minimum density difference 271c is, the greater a density difference between a ground and a character is, a possibility of a character is high. On the other hand, a dot image in which many dots are present, has a rapid density change between a ground and a dot part, and the degree of complexity 271b which is an average of the density difference of adjacent pixels thus becomes large. Therefore, the larger the degree of complexity 271b is, the higher a possibility of dot judgment is. On the other hand, since the density of a photograph changes smoothly, both of the maximum-minimum density difference 271c and the degree of complexity 271b become smaller.

Further, since the larger the connectivity 271a is, the higher a possibility of a character is, a judgment result is obtained from three input which are a connection average length which is a result of the connectivity 271a, a density difference average value of the adjacent pixels of the degree of complexity 271b and the maximum-minimum density difference 271c, as a judgment result, by digitizing and outputting like a letter (0), a dot (1), a photograph (2) and others (3).

Subsequently, description will be given for character rectangle judgment processing by the character rectangle judging portion 272 by using FIG. 8. First, a character is surrounded by a rectangle, and the font size is calculated from the number of pixels of a longer side thereof. Specifically, it is calculated from "font size=A (arbitrary values) x the number of pixels of rectangle of character". Here, for example, 1 dot of font is defined as 75 dpi. When the resolution for scanning a character is 600 dpi, the above arbitrary value A can be calculated as A=75/600.

Here, in the case of character judgment, a character is stored as a rectangle block of a character. For example, in the case of a rectangle block shown in FIG. 9, upper-left coordinates (Xs, Ys) and upper-right coordinates (Xe, Ye) are stored.

Figure 8:
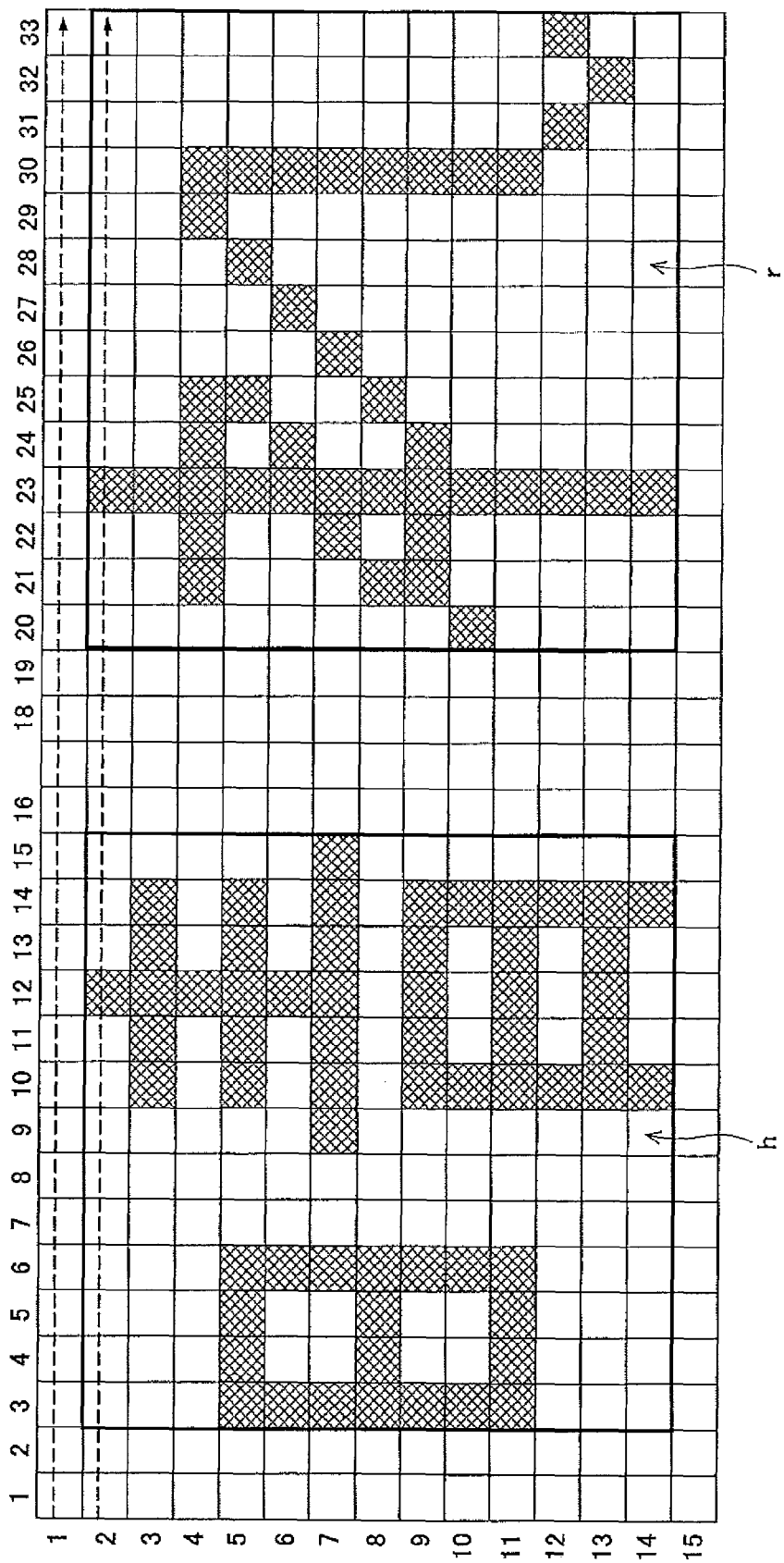
FIG. 8 is a view for explaining an example of character rectangle judgment processing by a character rectangle judging portion.
Figures 9, 10:
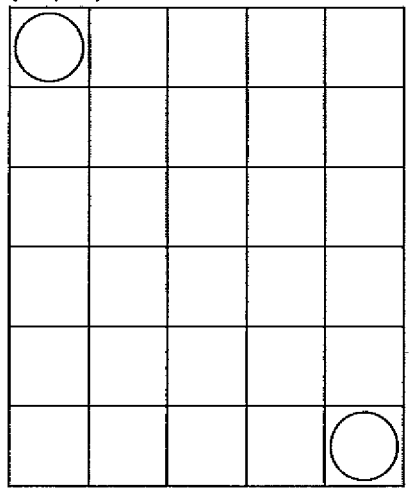
FIG. 9 is a view showing an example of a rectangle block.
FIG. 10 is a view for explaining an example of a management status of a rectangle block in FIG. 8.
Figure 15A:
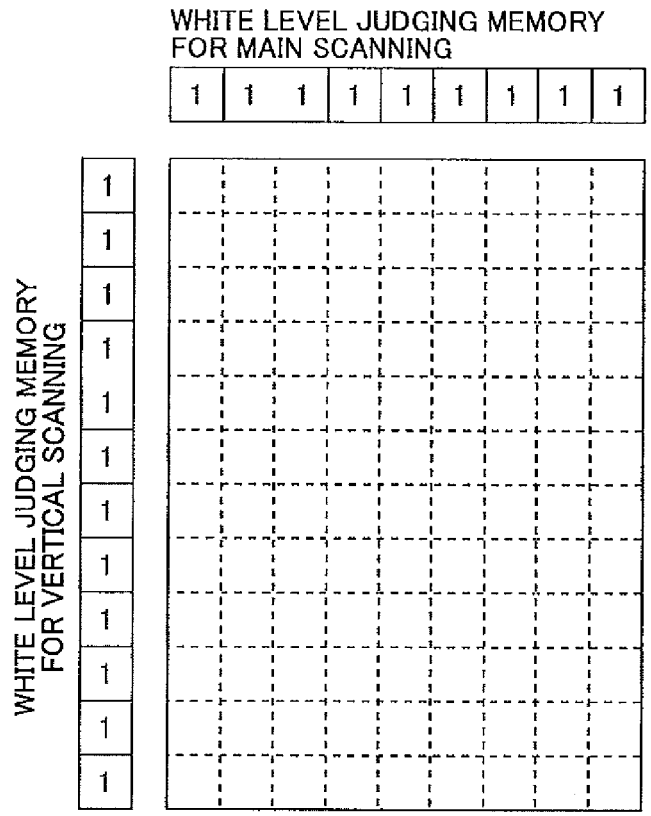
FIG. 15A to FIG. 15B are views for explaining white level judging processing which is executed by a white level judging portion.
Figure 15B:
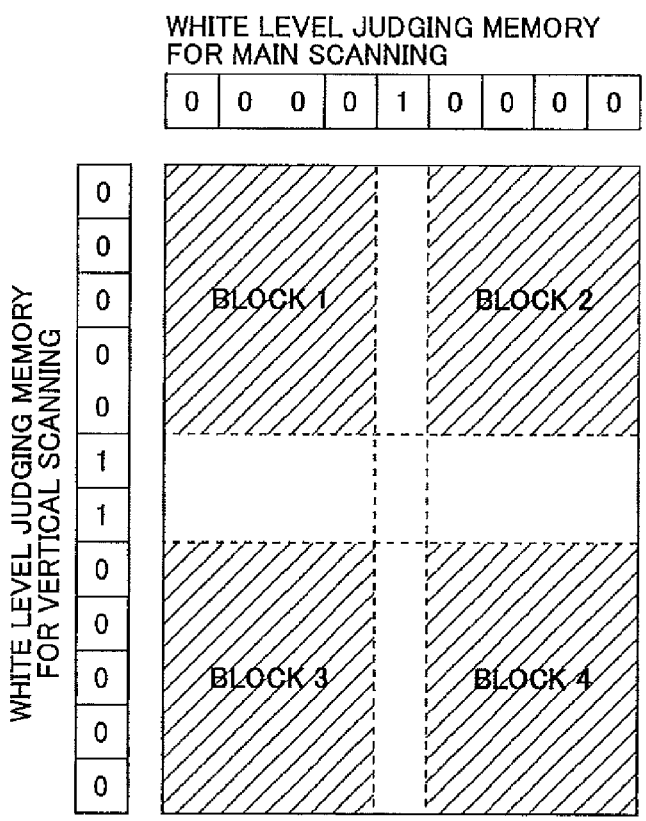

In the case of a rectangle block in FIG. 8, it is managed in the state shown in FIG. 10, for example. That is, coordinates showing "h" (upper-left coordinates (3, 2)-lower-right coordinates (15, 14)) are stored in an address 1, and coordinates showing "r" (upper-left coordinates (20, 2)-(33, 14)) are stored in an address 2.

Description will be given for processing for determining a rectangle for the case of FIG. 11 as an example. First, confirmation is made for whether there is a dot in the main scanning direction (in the direction of 1-18 pixels), and if there is a dot, upper-left coordinates (Xs, Ys) and lower-right coordinates (Xe, Ye) are stored as rectangular coordinates before determination. Then, when the stored coordinates exist next to a value between Xs and Xe of the main scanning coordinates of other rectangular coordinates before determination, the rectangle is combined.

Specifically, when "line that is currently scanned (current line number)−Ye=1" is satisfied as a condition, the rectangle before determination serves as a determined rectangle (condition 1). Further, when the main scanning Xs is next to (adjoining) the main scanning Xe, rectangles are combined (condition 2). At this time, the upper-left coordinates (Xs, Ys) select a minimum value, and the lower-right coordinates (Xe, Ye) select a maximum value.

In the case of an example of FIG. 11, when the first line is scanned, a dot is detected at (X, Y)=(2, 1). Therefore, as a rectangle before determination, the upper-left coordinates (Xs=2, Ys=1) and the lower-right coordinates (Xe=2, Ye=1) are stored as a rectangle 1 as shown in FIG. 12A.

Subsequently, when the second line is scanned, a dot is detected at (X, Y)=(12, 2). Therefore, as a rectangle before determination, the upper-left coordinates (Xs=12, Ys=2) and the lower-right coordinates (Xe=12, Ye=2) are stored as a rectangle 2 as shown in FIG. 12B.

Here, when the scanning of the second line is finished, the rectangle 1 of a rectangle before determination satisfies the condition 1 (current line number (2)−Ye (1)=1). Therefore, the rectangle 1 becomes a determined rectangle as shown in FIG. 12C, and a current rectangle 2 moves to the rectangle 1.

Here, appearance of the determined rectangle is shown in FIG. 12D. In FIG. 12D, a determined rectangle 1, x-side length ("1") and y-side length ("1") of the determined rectangle 1 are stored.

Similarly, as shown in FIG. 13A, the third line is scanned, then the upper-left coordinates (Xs=10, Ys=3) and the lower-right coordinates (Xe=10, Ye=3) are stored as the rectangle 2 before determination. Additionally, as shown in FIG. 13B, the upper-left coordinates (Xs=11, Ys=3) and the lower-right coordinates (Xe=11, Ye=3) are stored as a rectangle 3 before determination.

Here, when Xs and Xe are compared, the values that are stored in the rectangles 1 to 3 satisfy the condition 2. The rectangle 1 to the rectangle 3 are then combined to be stored. That is, a minimum value and a maximum value are stored as the upper-left pixels (Xs=10, Ys=2) and a lower-right pixels (Xe=12, Ye=3), respectively, in the rectangle 1.

Figure 14:
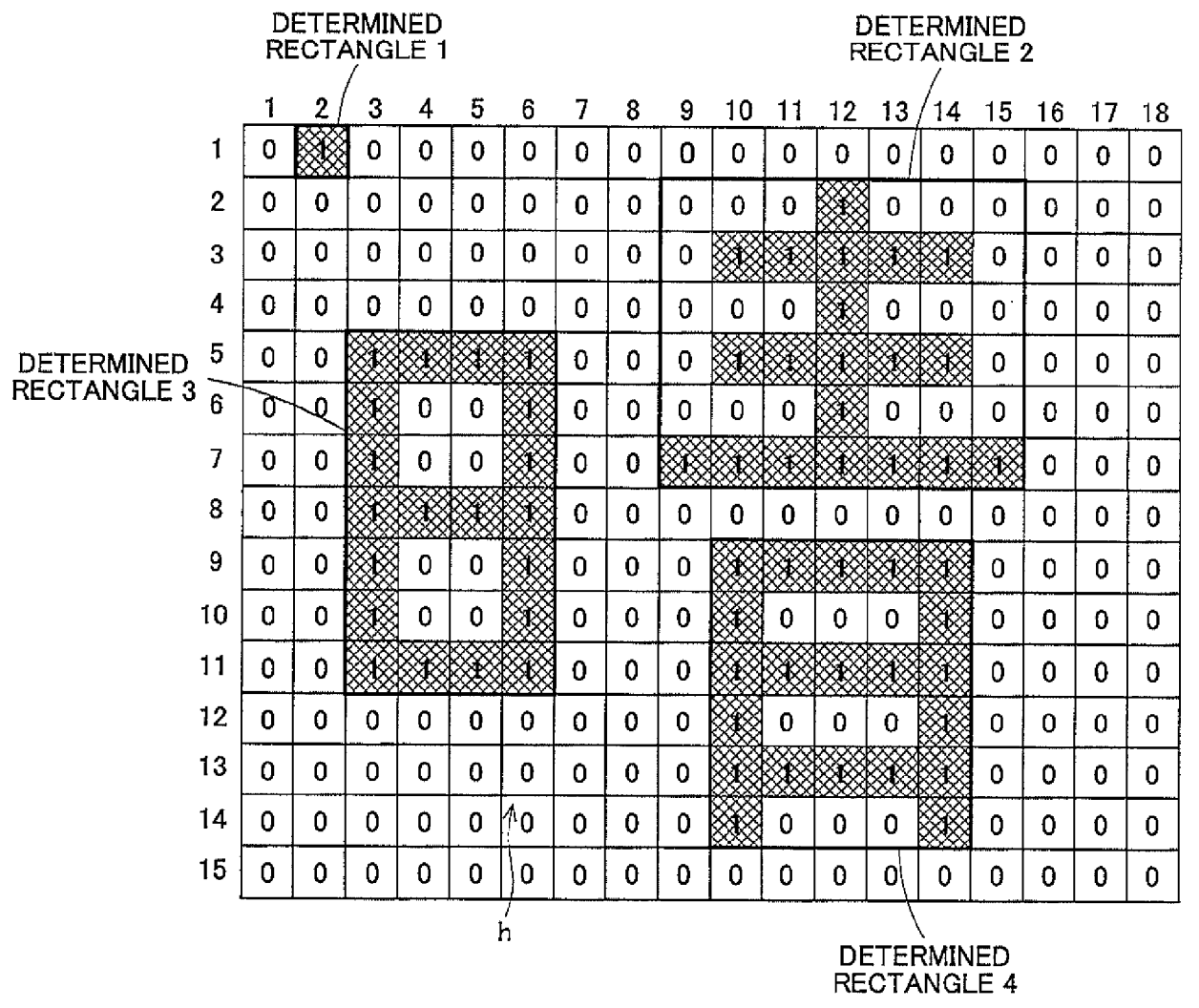

FIG. 13D shows the determined rectangle at the time of finishing 15 lines. Further, FIG. 14 is a figure showing the state of the determined rectangle. Additionally, the side-length of the main scanning and the side-length of the vertical scanning direction can be calculated from Xe−Xs+1 and Ye−Ys+1, respectively. In the case of the determined rectangle 2, the side-length of the main scanning (number of pixels) is calculated as "7".

Note that, when the value "1" used in the above-described condition expressions 1 and 2 is set to a value of "2" or larger, it is possible to prevent a character judgment mistake and shortening of a side-length due to a structure of a radical of a character or the like. For example, in the case of "line that is currently scanned (current line number)−Ye=2" in the condition expression 1, it is found that the determined rectangle 2 shown in FIG. 14 is bonded to a determined rectangle 4 and the side-length of the vertical scanning direction (number of pixels) becomes "13", thus becomes a side-length further close to a character.

Here, as a processing order of pixels, processing is performed in the direction of a broken-line arrow shown in the above-described FIG. 8. That is, processing of pixels is performed in the main scanning direction (toward the right side from the left side of the first line of FIG. 8). When a rectangular part that is judged as a new character then appears, the part is assigned as a rectangle block of a character.

Further, when the rectangle blocks adjoin each other, the rectangle blocks are further bonded regarding the blocks as one rectangle. A bond of the rectangle blocks may be performed between lines. That is, characters arranged in a predetermined space are judged as the same rectangle block, and are bonded as one block.

Subsequently, description will be given for white level judgment processing performed by the white level judging portion 273. The white level judgment processing is to provide white level judging memory for the main scanning and the vertical scanning respectively and set an initial value to a white level value (here, "1"). Then, when each pixel is other than "white", the value is replaced with an effective image judgment value (here, "0"). Pixels that become "1" both in the main scanning direction and the vertical scanning direction are judged as a white state, that is, a blank.

Then, the device control portion 22 performs processing for identifying blank parts of image data. Specifically, the blank parts are judged by referring to the above-described white level judging memory for the main scanning and white level judging memory for the vertical scanning. Subsequently, judgment is made for whether or not they are N-up printing based on a distribution state of the parts judged as blanks, which makes it possible to specify the N number. Specifically, in the case of an example of FIG. 15B, the image data of a document read by the image reading portion 29 is divided into rectangle blocks 1 to 4 by the area separating portion 271 and the character rectangle judging portion 272. Then, the white level judging portion 273 replaces judgment values of pixels corresponding to these rectangle blocks 1 to 4 with "0" for the white level judging memory for the main scanning and the white level judging memory for the vertical scanning, and a part where the judgment value of a pixel is "1" is judged as a blank. In the case of the example, it is possible to judge as FOUR-UP according to a distribution state of the blank part.

In this way, judgment processing of N-up printing is performed by which the image processing portion 27 and the device control portion 22 detect a blank part between printing areas.

FIG. 16 is a diagram showing an example of an initial set value input screen displayed on a displaying portion 28a of the MFP 2, and in the figure, 40 denotes an initial set value input screen, 41 denotes a preview button, 42 denotes a test printing button, 43 denotes a preview display area, 44 denotes an OK button, and 45 denotes a cancel button. As described above, when the MFP 2 is operated by users such as an administrator to be instructed to select "initial set value input" from a menu or the like, in the case of printed matter 5 in which a printing set values obtained by reading the printed matter 5 of FIG. 3 by the above-described method are displayed on the display portion 28a as initial set values of the printer driver 14a in the state of setting on the initial set value input screen 40 of the printer driver 14a, "double-sided", "two-up", "color" and "A4" are set and displayed on the initial set value input screen 40 as printing set values of each item of single-sided/double-sided, N-up printing, monochrome/color and a sheet size.

An administrator inputs printing set values for items other than the above-described single-sided/double-sided, N-up printing monochrome/color and sheet size as appropriate, and when agreeing with the initial set values set in the initial set value input screen 40, presses the OK button 44, which are stored in the HDD 25 of the MFP 2 as initial set values of a printer driver. Otherwise, then the cancel button 45 is pressed to cancel the initial set value input processing. Further, when the initial set values set to the initial set value input screen 40 are desired to be changed, the administrator operates the touch panel portion 28b and the input key 28c of the operation portion 28, and presses the OK button 44 after changing to the desired initial set values. In this case, the initial set values after changing are stored in the HDD 25.

In this way, the administrator operates the MFP 2 to display the initial set value input screen 40 on the touch panel portion 28b, and after adjusting the initial set values of the printer driver 14a on the initial set value input screen 40 as appropriate, it is possible to store the initial set values in the MFP 2.

Here, at the time of performing printing by a printer function, accessing to the MFP 2 is made through the printer driver 14a from an administrator PC 1 or the client PC 3. Therefore, each PC (printer driver 14a) stores the initial set values inside the MFP 2 as described above so that updating judgment of the initial set values of the printer driver 14a can be performed easily without taking labor of accessing an external device such as a server apparatus. For example, when the printer driver 14a accesses to the MFP 2, it is possible to judge whether or not the updating is made by comparing the initial set values that are set in the printer driver 14a and the initial set values that are stored in the MFP 2 for each item. Then, in the case of judging it is updated, the initial set values that are set in the printer driver 14a may be updated to the initial set values that are stored in the MFP 2 for the updated item.

Further, in a case where the initial set values are updated, the MFP 2 can transmit the initial set values that are stored in the MFP 2 to the administrator PC 1 according to operation by an administrator or the like. In the administrator PC 1, the initial set values that are received from the MFP 2 can be set as the initial set values of the printer driver 14a based on operation by an administrator. Then, the administrator may operate the administrator PC 1, and transmit the initial set values of the printer driver 14a that are set as described above to the other client PC 3 to set in each client PC 3.

In this way, since the initial set value input screen 40 can be displayed in the state where printing set values of printed matter are set when inputting the initial set values of the printer driver 14a from the MFP 2, a user such as an administrator, even in the case of being unfamiliar, is not confused with input setting of the initial set values, and an actual printing set values of printed matter are diverted so that a user can set as intended, and erroneous input of the initial set values can be prevented.

In FIG. 16, when the preview button 41 on the initial set value input screen 40 is pressed, it is possible to display a preview image based on the initial set values before being changed or after being changed by a user in a preview display area 43. Additionally, when the test printing button 42 on the initial set value input screen 40 is pressed, it is possible to perform test printing based on the initial set values before being changed or after being changed by a user. In this case, it is assumed that the MFP 2 is provided with a preview function and a test printing function.

When the initial set values of the printer driver 14a are input from a PC such as the administrator PC 1, it is hard to image actual printed matter by the initial set values that are input, however, when the initial set values of the printer driver 14a are input by the MFP 2, it is easy to perform confirmation of printed matter by performing test printing on site, confirmation of a printed image by the preview function, and the like. Additionally, since the initial set values can be input while seeing a printing result with the MFP 2, detailed settings of density, a color tone, a blank, a binding margin, and the like can be performed easily.

Figure 17:
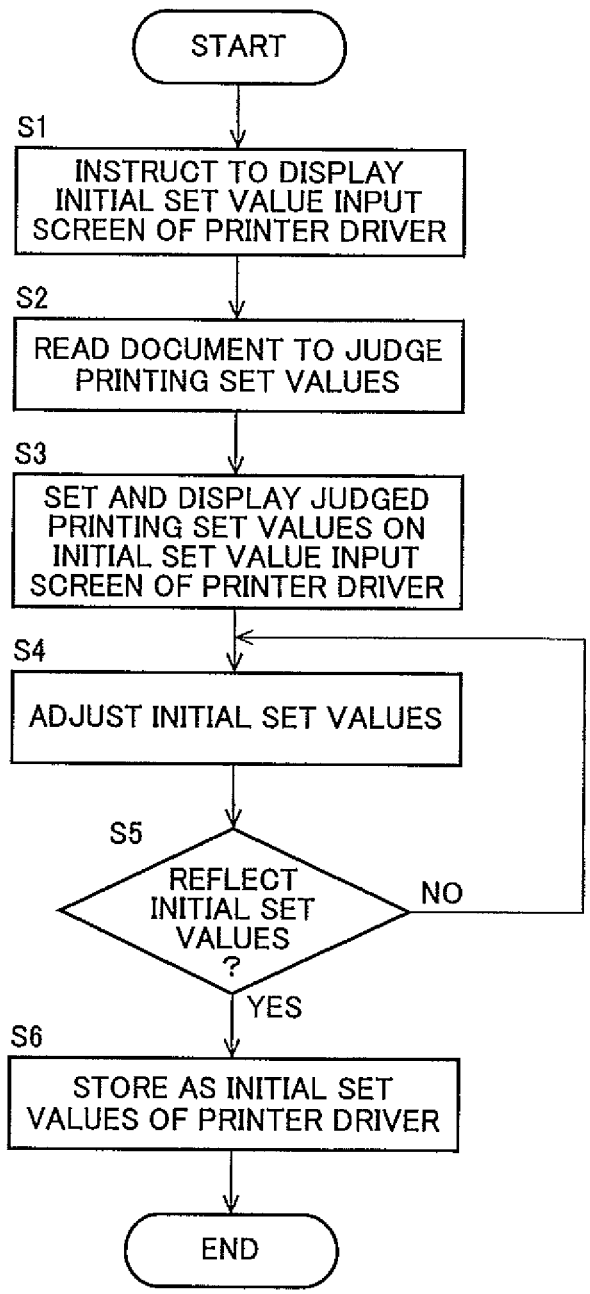
FIG. 17 is a flowchart for explaining an example of an initial set value inputting method by the MFP of the present invention.

FIG. 17 is a flowchart for explaining an example of an initial set value inputting method by the MFP 2 of the present invention. A user such as an administrator operates the operation portion 28 of the MFP 2 to instruct to display the initial set value input screen 40 (FIG. 16) of the printer driver 14a which is installed in the administrator PC 1 (step S1). The MFP 2, receiving this display instruction, reads a document (printed matter 5) to judge the printing set values at the time of printing the printed matter 5 (step S2), and the judged printing set values are set and displayed on the initial set value input screen 40 (step S3).

Next, a user performs adjustment to the desired initial set values on the initial set value input screen 40 displayed on the touch panel portion 28b of the operation portion 28 (step S4), and the MFP 2 judges whether or not the initial set values are reflected (step S5). That is, when the OK button 44 of the initial set value input screen 40 is pressed (in the case of YES), the initial set values input in the initial set value input screen 40 are stored in the HDD 25 as the initial set values of the printer driver 14a (step S6). Further, at the step S5, when the OK button 44 of the initial set value input screen 40 is not pressed (in the case of NO), processing is repeated after returning to the step S4, however, when the cancel button 45 is pressed, or when detecting that the OK button 44 is not pressed for a predetermined time, display of the initial set value input screen 40 may be finished to cancel initial set value input processing.

Figure 18:
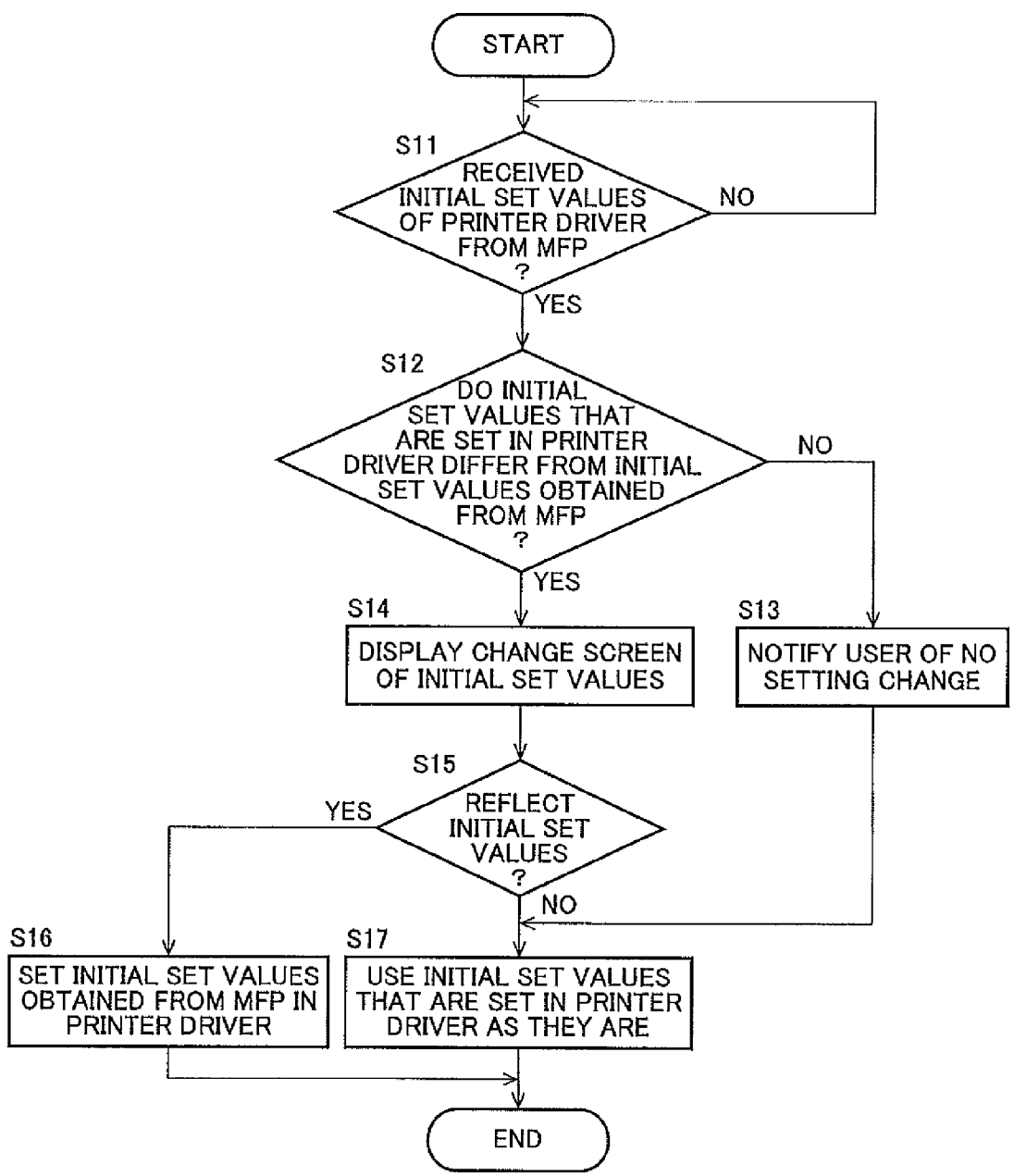
FIG. 18 is a flowchart for explaining an example of initial set value update processing in an administrator PC.

FIG. 18 is a flowchart for explaining an example of initial set value updating processing in the administrator PC 1. In the example, description will be given for a case where the initial set values of the printer driver 14a subjected to input setting in the MFP 2 are transmitted to the administrator PC 1. First, the administrator PC 1 judges whether or not the initial set values of the printer driver 14a are received from the MFP 2 (step S11), and when judging that the initial set values are received from the MFP 2 (in the case of YES), whether or not the initial set values that are set in the printer driver 14a differ from the initial set values obtained from the MFP 2 is judged (step S12). Further, at the above step S11, when judging that the initial set values are not received from the MFP 2 (in the case of NO), the procedure moves to a waiting receiving state at the step S11.

Figure 19:
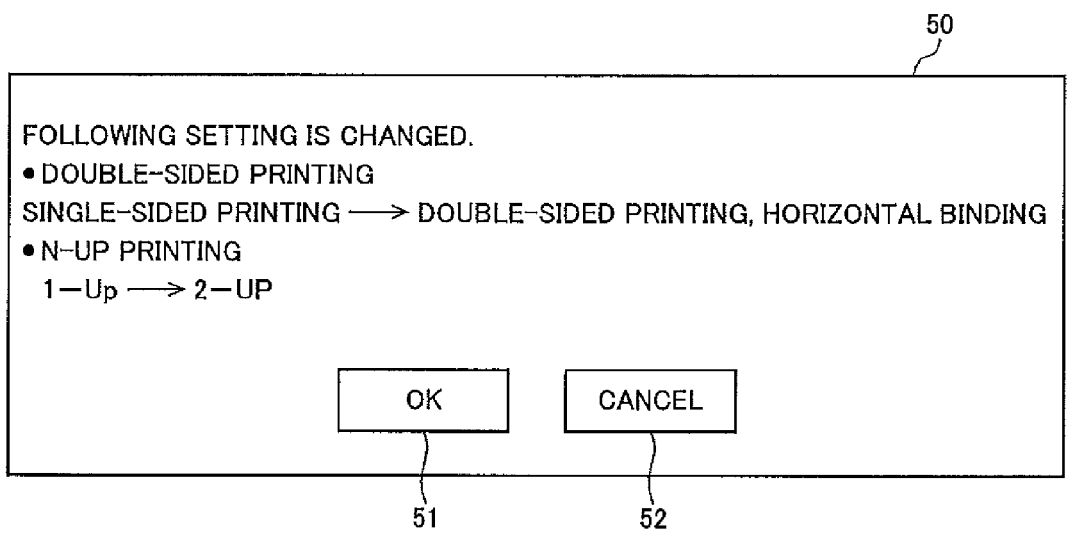
FIG. 19 is a view showing an example of an initial set value changing screen which is displayed on the administrator PC.

Next, the administrator PC 1, when judging that the initial set values of the printer driver 14a are the same as the initial set values of the MFP 2 at the step S12 (in the case of NO), notifies a user of no setting change (step S13), and moves to a step S17. Additionally, when judging that the initial set values of the printer driver 14a differ from the initial set values of the MFP 2 at the step S12 (in the case of YES), an initial set value changing screen 50 as shown in FIG. 19 is displayed (step S14), and the administrator PC 1 judges whether or not the initial set values are reflected (step S15). That is, when an OK button 51 of the initial set value change screen 50 is pressed (in the case of Yes), the initial set values that are changed on the initial set value change screen 50 are set in the printer driver 14a (step S16). Further, when a cancel button 52 of the initial set value change screen 50 is pressed, or when detecting that the OK button 51 is not pressed for a predetermined time at the step S15 (in the case of NO), the initial set values are not changed, and the initial set values that are set in the printer driver 14a are used as they are (step S17).

As described above, printed matter printed in monochrome, TWO-UP and double-sided is read with the MFP by a user such as an administrator so that it is possible to perform input setting of initial set values of a printer driver, and a load of input work of the initial set values is thus able to be reduced.

According to the present invention, predetermined printed matter is read with an image forming apparatus, a user is thereby able to perform input setting of initial set values (printing conditions) of a printer driver as intended as well as suppress erroneous input.

The invention claimed is:

1. An image forming apparatus which is connectable with an information processing apparatus having a printer driver installed therein and controlled by the printer driver, the image forming apparatus comprising:
   an image reading portion which optically reads predetermined printed matter to input image data;
   a printing set value judging portion which judges printing set values when the printed matter is printed from the input image data; and
   an initial set value input portion which inputs the judged printing set values as initial set values of the printer driver, the judged printing set values also being set as set values of the image forming apparatus.

2. The image forming apparatus as defined in claim 1, wherein the initial set value input portion sets the printing set values judged by the printing set value judging portion to an initial set value input screen of the printer driver, and the initial set values set to the initial set value input screen are changeable by a user.

3. The image forming apparatus as defined in claim 1, wherein the printing set value judging portion judges at least one of set values of a sheet size, monochrome or color, N-up printing, single-sided or double-sided, as the printing set values when the printed matter is printed.

4. The image forming apparatus as defined in claim 1, wherein a preview image based on the initial set values before being changed or after being changed by a user can be displayed on an initial set value input screen of the printer driver.

5. The image forming apparatus as defined in claim 1, wherein test printing based on the initial set values before being changed or after being changed by a user can be executed on an initial set value input screen of the printer driver.

6. An image forming system, comprising:
   an information processing apparatus having a printer driver installed therein; and
   an image forming apparatus controlled by the printer driver, the information processing apparatus and the image forming apparatus being connected through a network,
   wherein the image forming apparatus further includes:
      an image reading portion which optically reads predetermined printed matter to input image data;
      a printing set value judging portion which judges printing set values when the printed matter is printed from the input image data; and
      an initial set value input portion which inputs the judged printing set values as initial set values of the printer driver, the judged printing set values also being set as set values of the image forming apparatus.

* * * * *